July 9, 1940.  J. W. FITZ GERALD  2,207,092
ENGINE STARTER
Filed Aug. 28, 1937   2 Sheets-Sheet 2
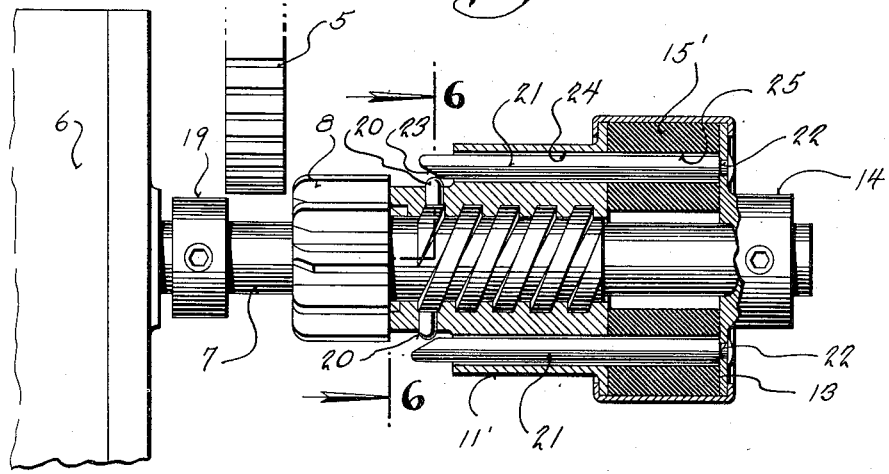
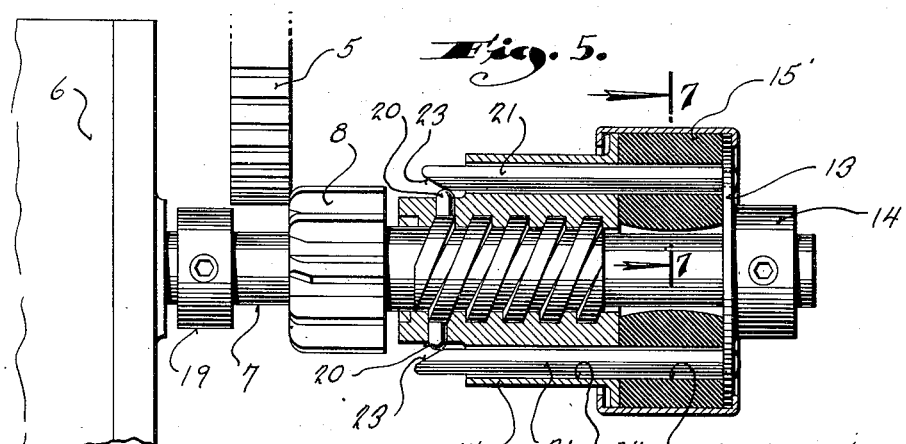
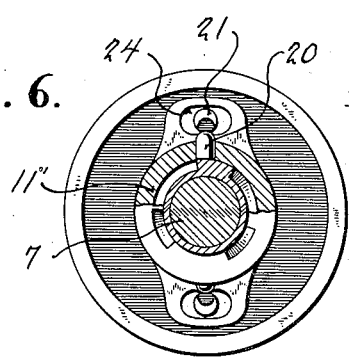
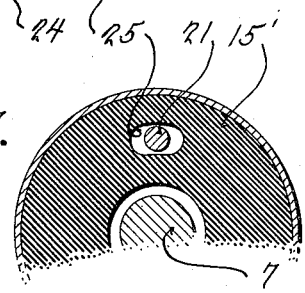
Inventor
John W. FitzGerald
By Hamilton Jones
Attorney Patented July 9, 1940

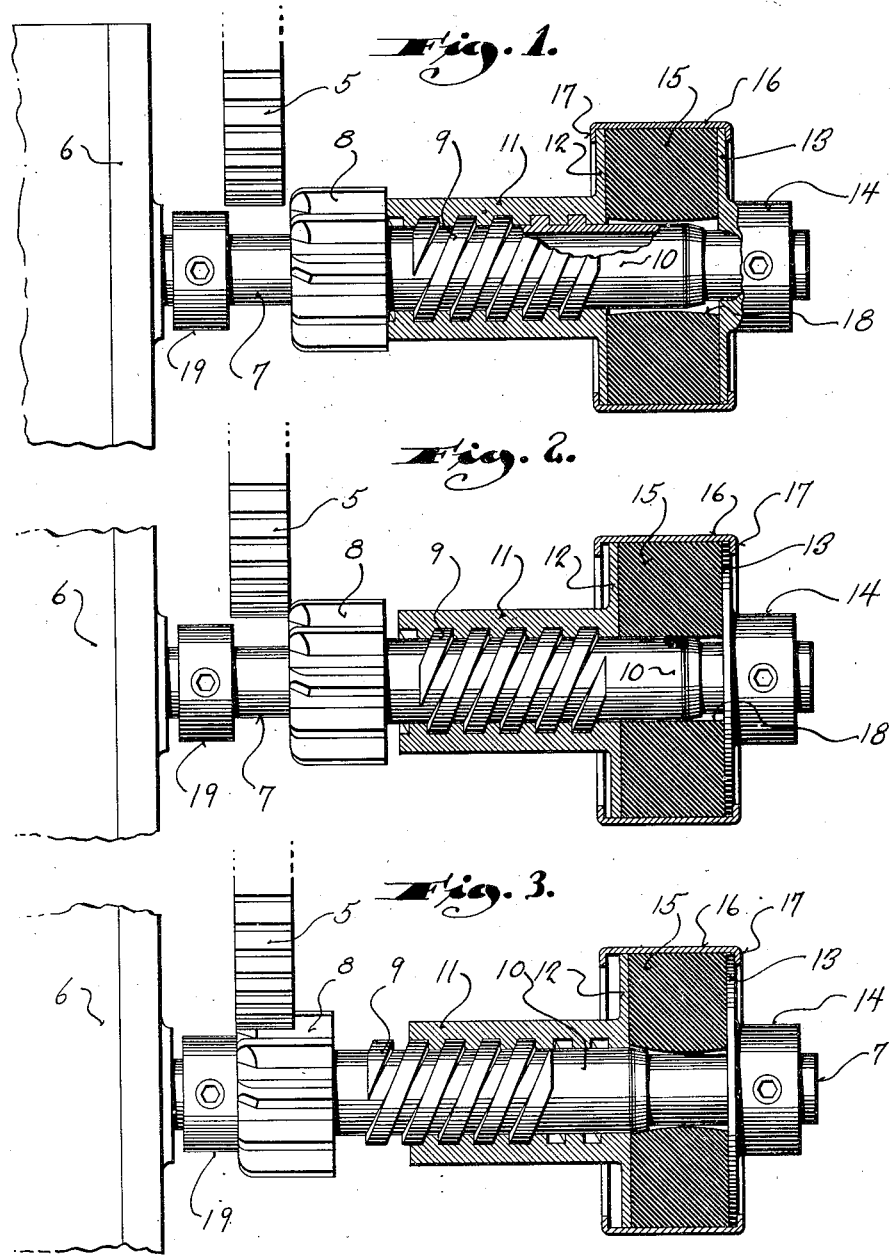

2,207,092

UNITED STATES PATENT OFFICE 2,207,092

ENGINE STARTER

John W. Fitz Gerald, Milwaukee, Wis., assignor to Briggs & Stratton Corporation, Milwaukee, Wis., a corporation of Delaware Application August 28, 1937, Serial No. 161,433

9 Claims. (Cl. 74—7)

This invention relates to improvements in engine starters and refers particularly to starters for automobile engines.

As is well known, engine starters for this purpose generally comprise a motor driven shaft, a pinion on the shaft engageable with the ring gear of the engine, and a screw threaded connection between the shaft and the pinion operable upon initial operation of the motor to propel the pinion forwardly into mesh with the ring gear.

Not infrequently the pinion will strike the ring gear with the teeth meeting end to end. When this happens, it is necessary that a slight rotation be imparted to the pinion to effect proper meshing of the gears.

Heretofore, engine starters have been so constructed that this slight twist was imparted to the pinion gear solely by the friction at the screw threaded connection between the pinion gear and motor driven shaft.

In other words when the forward propulsion of the pinion gear was arrested by an improper meshing of its teeth with those of the ring gear, it was not until sufficient friction had been built up in the screw threaded connection to overcome the component of friction at the improper engagement of the gears that the necessary rotation would be imparted to the pinion gear.

As a consequence proper meshing of the gears was often delayed and at times it was impossible to impart rotation to the pinion in this manner with the result that the starter would "jam."

With these objections to past starter constructions in mind, it is an object of the present invention to provide means which will relieve the threaded connection of the function of imparting rotation to the pinion gear in the event of improper meshing of the gears.

More specifically it is an object of this invention to provide means for effecting a substantially positive driving connection between the motor driven shaft and the pinion gear, independently of the screw threaded connection, whenever the gears meet with their teeth abutting end to end.

Another object of this invention is to provide an engine starter wherein a single element provides axial and torsional resiliency for the starter and also provides a positive driving connection to impart rotation to the pinion gear in the event of improper meshing of the gears.

Another object of this invention is to provide a rubber clutch for effecting a substantially positive driving connection between the motor driven shaft and pinion gear in the event of improper meshing of the gears.

Another object of this invention resides in the provision of means operable upon relative endwise motion of the pinion gear and the motor driven shaft to provide a secure driving connection between the shaft and the pinion gear.

And a further object of this invention is to provide a starter construction wherein a secure driving connection is established between the motor driven shaft and the pinion gear through the medium of a pushpin, cam actuated into frictional engagement with the gear carried screw upon improper meshing of the gears.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiment of the invention constructed according to the best modes so far devised for the practical application of the principles thereof, and in which:

Figure 1 is a side view partially in longitudinal section, of an engine starter constructed in accordance with this invention;

Figure 2 is a view similar to Figure 1 but showing the positions of the parts at the time of improper end to end engagement of the gears;

Figure 3 is a view similar to Figure 1 but showing the gears properly meshed and with the parts in the positions they occupy when the engine load is being picked up;

Figure 4 is a view similar to Figure 1 illustrating a slightly modified embodiment of the invention;

Figure 5 is a view similar to Figure 1 illustrating the parts in the positions they occupy during improper end to end engagement of the gears;

Figure 6 is a cross sectional view taken through Figure 4 on the plane of the line 6—6; and Figure 7 is a detail cross sectional view taken through Figure 5 on the plane of the line 7—7.

Referring now particularly to the accompanying drawings in which like numerals designate like parts, the numeral 5 designates the ring gear of an engine with which the starter is associated. The starter comprises a motor 6 which drives a shaft 7 on which a pinion gear 8 is freely slidably and rotatably mounted for movement to and from meshing engagement with the ring gear 5.

Extending from the pinion gear and fixed with respect thereto is a screw threaded sleeve 9 having an unthreaded outer end portion or extension 10. Threaded on the sleeve 9 is a nut member or collar 11. This nut member or collar has an annular flange 12 which is spaced from a similar flange 13 on a collar 14 fixed to the outer end of the shaft 7. Disposed between the flanges 12 and 13 is a rubber collar 15. Frictional engagement between the opposite faces of the rubber collar and the flanges 12 and 13 is maintained by a cover 16 whose marginal edges 17 are flanged inwardly to engage over the peripheries of the flanges and hold the same against separation.

The unthreaded extension 10 projects into the bore 18 of the rubber collar and the walls of the bore 18 are curved as shown in Figure 1 to have a minimum diameter at the middle and larger diameters at its ends. With the parts in their normal free positions as depicted in Figure 1, a slight clearance exists between the minimum diameter of the bore 18 and the unthreaded extension 10 of the pinion gear sleeve.

Operation

Upon initial rotation of the motor shaft the inertia of the pinion gear acting in conjunction with the screw threaded connection between the sleeve 9 and the nut member 11 propels the pinion gear forwardly toward the ring gear 5. In the event of improper meshing of the gears, as shown in Figure 2, the consequent cessation of forward propulsion of the pinion gear and the momentary holding of the pinion gear against possible rotation, causes the nut member or collar 11 to back up on the screw threaded sleeve 9 clamping the rubber collar 15 between the flanges 12 and 13. As a consequence, the rubber collar 15 deforms to take up the slight clearance between its bore and the sleeve extension 10 so that the rubber collar grips the sleeve extension to provide a secure and substantially positive driving connection from the shaft to the pinion gear 8.

It is to be observed that this driving connection from the shaft to the pinion gear transmits rotation to the pinion without wear on the screw threads, or in other words, without imposing excessive friction on the threads.

Upon complete engagement of the gears the forward advance of the pinion gear is completely arrested by its engagement with a stop 19 fixed to the shaft and until the load of the engine is picked up the pinion gear is held against rotation so that the nut member or collar is again backed up on the screw threaded sleeve to again apply pressure to the rubber collar 15.

When this occurs, the load of the engine is picked up by the motor shaft through the torsionally yielding connection provided by the rubber collar 15 which twists as the load is picked up. In this manner not only is the shock of starting cushioned, but the breakaway load is less on the starting motor because of the force built up within the rubber collar 15.

It is to be observed that during the actual application of rotation to the ring gear, the sleeve extension 10 is not gripped by the collar 15 so as not to interfere with the twisting of the rubber collar and the torsional yieldability obtained thereby.

Rotation may also be imparted to the pinion gear in the event of improper meshing of the gears independently of the friction in the threaded connection by a construction as shown in Figures 4 to 7 inclusive.

In this embodiment of the invention the parts are substantially like that previously described, but in place of having the rubber collar 15' grip an extension on the threaded sleeve, the nut member or collar 11' carries one or two friction pins 20 arranged to press down onto the top of the screw thread on the sleeve 9.

To press these pins into operative frictional engagement with the screw, actuating stems 21 are provided. These stems are fixed as at 22 to the flange 13, and their inner ends 23 are bevelled to provide cam surfaces.

The pins 21 pass freely through holes 24 and 25 in the collars 11' and 15' respectively. These holes, as best shown in Figures 6 and 7, are enlarged circumferentially with respect to the axis of the starter as a whole so as to allow for the torsional displacement of parts during the actual picking up of the load.

The operation of this modified embodiment of the invention, is as follows:

Upon initial rotation of the motor shaft, the pinion gear 8 is propelled forwardly by the screw threaded connection between the sleeve 9 and the nut member 11' in the same manner as described in connection with Figures 1, 2 and 3. In the event of improper meshing of the gears, as shown in Figure 5, the cessation of forward propulsion of the pinion gear and the momentary holding of the same against possible rotation causes the nut member or collar 11' to back up on the screw threaded sleeve 9. This motion of the nut member deforms the rubber collar 15' and carries the friction pins 20 into engagement with the cam surfaces 23. The pins 20 are thus urged into frictional engagement with the sleeve 9 to establish a rotary driving connection from the shaft to the pinion which imparts the desired degree of rotation to the pinion gear to allow the same to properly mesh with the ring gear.

Upon complete engagement of the gears, the forward advance of the pinion gear is completely arrested by its engagement with the stop 19 and until the load of the engine is picked up, the pinion gear is held against rotation so that the nut member or collar 11' is backed up to again carry the friction pins into engagement with the cam surfaces 23. However, as the frictional engagement of the cam surfaces with the sleeve 9 is not sufficient to pick up the load of the engine, the nut member 11' continues its backward movement to further deform the rubber collar 15' and establish a torsionally yielding driving connection from the shaft to the pinion.

It is to be noted, therefore, that the nut member 11' carries the friction pins 20 past the cam surfaces 23 so that the pins engage the under surfaces of the actuating stems 21. The frictional engagement of the pins 20 with the sleeve 9, however, assists the rubber collar 15' in providing the driving connection from the shaft to the pinion.

From the foregoing description taken in connection with the accompanying drawings, it will be apparent to those skilled in the art, that this invention provides an engine starter, which through the provision of substantially positive means for imparting rotation to the pinion gear in the event of improper meshing of the gears, not only insures a quicker meshing of the gears, but also precludes the possibility of having the starter jam, which often occurs with constructions in which the friction of the threads is relied upon along to impart rotation to the pinion gear.

What I claim as my invention is:

1. In an engine starter, the combination of: a motor driven shaft; a pinion freely movable both axially and rotatably with respect to the shaft; a screw threaded part fixed with respect to the pinion; another screw threaded part threaded to said first named part to propel the pinion forwardly upon relative rotation between said parts; a resilient driving element between the shaft and the second designated screw threaded part through which rotation is resiliently imparted to said second designated screw threaded part; and means on the first designated screw threaded part adapted to be gripped by the resilient driving element upon interference with the forward propulsion of the pinion for establishing a rotary driving connection from the shaft to the pinion to thereby relieve the screw connection from imparting rotation to the pinion through frictional contact between its elements.

2. In an engine starter, the combination of a motor driven shaft; a pinion freely movable both axially and rotatably with respect to the shaft; an externally threaded sleeve fixed with respect to the pinion; a nut member threaded on said sleeve; a driving connection between the nut member and the shaft so that rotation of the nut member by the shaft and with respect to the pinion effects forward propulsion of the pinion; and means engageable with said externally threaded sleeve operable upon interruption of the forward propulsion of the pinion for establishing a rotation imparting driving connection from the shaft to the pinion independent of the nut member.

3. In an engine starter, the combination of a motor driven shaft; a pinion freely movable both axially and rotatably with respect to the shaft and adapted to be meshed with a ring gear on the engine; an externally threaded sleeve fixed to the pinion; a nut member threaded on the sleeve; means to transmit rotation from the shaft to the nut member, relative rotation between the nut member and the threaded sleeve effecting forward propulsion of the pinion toward the ring gear, and means engageable with said externally threaded sleeve for establishing a secure rotation imparting driving connection from the shaft to the pinion upon improper meshing of the pinion with the ring gear.

4. In an engine starter having a motor driven shaft and a pinion freely movable both axially and rotatably with respect thereto: a screw threaded sleeve carried by the pinion; a nut member threaded on the sleeve, relative rotation of the sleeve and nut member effecting forward propulsion of the pinion; a driving connection between the shaft and nut member; a single resilient deformable element providing axial and torsional yieldability in the connection between the shaft and nut member; and means on the screw threaded sleeve adapted to be gripped by said resilient deformable element upon interference with the forward propulsion of the pinion during the initial period of such forward travel for turning the pinion independently of the nut member.

5. In an engine starter having a motor driven shaft and a pinion freely movable both axially and rotatably with respect thereto: an externally threaded sleeve carried by the pinion; a nut member threaded on the sleeve; a resilient deformable element confined between the nut member and a stop on the shaft and adapted to transmit rotation from the shaft to the nut member, relative rotation between the nut member and the threaded sleeve effecting forward propulsion of the pinion and upon interference with forward propulsion of the pinion deforming said element; and means including a part carried by the sleeve and adapted to be gripped by the resilient deformable element upon deformation thereof to effect a driving connection between the shaft and pinion.

6. In an engine starter having a motor driven shaft and a pinion freely movable both axially and rotatably with respect thereto: a threaded sleeve carried by the pinion; a nut member threaded on the sleeve and having a flange; a flanged collar fixed to the shaft in spaced relation to the flange on the nut member; a bored rubber element confined between said flanges and adapted to provide a yielding driving connection from the shaft to the nut member; and an extension on the sleeve projecting into the bore of the rubber element to be gripped thereby upon deformation resulting from the application of endwise pressure on the rubber element.

7. In an engine starter having a motor driven shaft and a pinion freely movable both axially and rotatably with respect thereto: an externally threaded sleeve carried by the pinion and having an outer unthreaded end portion; a nut member engaging the threaded portion of the sleeve; a stop fixed to the shaft in spaced relation to the adjacent end of the nut member; and resilient deformable means disposed between said stop and the adjacent end of the nut member and encircling the unthreaded end portion of the sleeve, said resilient deformable means being adapted upon deformation resulting from endwise pressure thereon, as produced by relative motion of said nut member and stop toward each other, to frictionally grip the unthreaded end portion of the sleeve.

8. In an engine starter having a motor driven shaft and a pinion freely movable both axially and rotatably with respect thereto: a sleeve carried by the pinion and having an external screw thread extending along part of its length and leaving an unthreaded outer end portion; a nut member engaged with the threads of the sleeve; a stop fixed to the shaft in spaced relation to the adjacent end of the nut member and adjacent to the unthreaded end portion of the sleeve; and a rubber collar encircling the unthreaded end portion of the sleeve and confined between said stop and the adjacent end of the nut member with its bore normally clearing the unthreaded end portion of the sleeve, said rubber collar being deformable upon endwise pressure exerted thereon by the nut member and the stop to take up said clearance and cause the rubber collar to grip the unthreaded end portion of the sleeve to provide a secure driving connection between the shaft and the pinion.

9. In an engine starter having a motor driven shaft and a pinion freely movable both axially and rotatably with respect thereto: an externally threaded sleeve carried by the pinion; a nut member threaded on said sleeve; a driving connection between the shaft and nut member so that rotation of the shaft imparts rotation to the nut member and relative rotation between the nut member and the screw threaded sleeve propels the pinion along the shaft and upon interference with forward propulsion of the pinion causes endwise motion of the nut member away from the pinion; a friction pin carried by the nut member and engageable with the screw threaded sleeve; and means operable upon endwise motion of the nut member away from the pinion for pressing said friction pin against the sleeve.

JOHN W. FITZ GERALD.